US008600325B2

(12) United States Patent
Jastram et al.

(10) Patent No.: US 8,600,325 B2
(45) Date of Patent: Dec. 3, 2013

(54) SIMULATED DEGRADATION OF SNR IN DECODED DIGITAL AUDIO CORRELATED TO WIRELESS LINK BIT-ERROR RATE

(75) Inventors: Robert Jastram, Asheville, NC (US); John P. Wendler, Stow, MA (US)

(73) Assignee: Harris Corporation, Melbourne, FL (US)

(*) Notice: Subject to any disclaimer, the term of this patent is extended or adjusted under 35 U.S.C. 154(b) by 795 days.

(21) Appl. No.: 12/757,353

(22) Filed: Apr. 9, 2010

(65) Prior Publication Data

US 2011/0250851 A1 Oct. 13, 2011

(51) Int. Cl.
*H04B 17/00* (2006.01)

(52) U.S. Cl.
USPC .................................... 455/226.4; 455/226.1

(58) Field of Classification Search
USPC ............... 455/226.1, 226.4, 67.11, 67.7, 63.1
See application file for complete search history.

(56) References Cited

U.S. PATENT DOCUMENTS

| | | | |
|---|---|---|---|
| 5,809,414 A * | 9/1998 | Coverdale et al. | 455/421 |
| 5,991,901 A | 11/1999 | Mulford et al. | |
| 6,243,568 B1 | 6/2001 | Detlef et al. | |

FOREIGN PATENT DOCUMENTS

| | | |
|---|---|---|
| EP | 1 432 154 A2 | 6/2004 |
| GB | 2 307 623 A | 5/1997 |
| WO | WO-97 34381 A2 | 9/1997 |

OTHER PUBLICATIONS

International Search Report mailed Aug. 4, 2011; Application Serial No. PCT/US2011/028582 in the name of Harris Corporation.

* cited by examiner

*Primary Examiner* — Lewis West
(74) *Attorney, Agent, or Firm* — Fox Rothschild, LLP; Robert J. Sacco

(57) ABSTRACT

Embodiments of the present invention provide a system, apparatus and method for an audible indicator of a quality of a received digital radio transmission. After receiving a digital radio transmission in a digital radio receiver, the quality of the received digital radio transmission is detected. Then an audible communication from the received digital radio transmission is decoded. Then an audible indicator is superimposed onto the audible communication, to form a composite audible signal. Finally, an amplitude of the audible indicator is dynamically adjusted relative to an amplitude of the audible communication, responsive to a quality of the received digital radio transmission.

26 Claims, 5 Drawing Sheets

SIMULATED DEGRADATION OF SNR IN DECODED DIGITAL AUDIO CORRELATED TO WIRELESS LINK BIT-ERROR RATE

BACKGROUND OF THE INVENTION

1. Statement of the Technical Field

The invention concerns radio communication method, apparatus, and system. More particularly, the invention concerns a method for a digital radio to provide an audible indicator of communication link quality.

2. Description of the Related Art

Analog radios provide a communication link for a baseband signal, such as an audio signal, by use of an analog radio transmitter and an analog radio receiver. An analog radio transmitter operates by amplifying the baseband signal, modulating the baseband signal by use of analog modulation techniques that are known in the art, frequency upconverting the modulated signal to radio frequencies (RF), and transmitting the RF signal to an analog radio receiver. The analog radio receiver recovers the baseband signal by downconverting and demodulating the received RF signal. Radio operators such as public safety personnel are very familiar with the operation of analog radios. Analog radios are simple, but a disadvantage of analog radio is that the quality of the received radio transmission, after demodulation in order to provide a received baseband signal, is prone to be poor (e.g., noisy) in situations such as low RF received power level, low signal-to-noise (SNR) ratio, and the presence of interference.

Receiver performance of analog radios gracefully degrades, such that the radio operator can hear increased noise on the demodulated baseband signal as the received RF signal weakens or the SNR degrades. The increased noise provides an aural cue to the radio operator, who may then use the aural cue to move to an area of better coverage. Furthermore, if the analog radio operator is able to hear conversations of other radio operators, the radio operator may be able to get additional audio cues of quality by listening to the quality of those other conversations on the analog radio.

In contrast, digital radios employ digital modulation techniques that are known in the art in order to provide a digitized communication signal from a transmitter to a receiver. The digitized communication signal may include a digitized baseband voice signal, or other baseband audible signals (e.g., music), or IP-based data traffic. Compared to analog radios, digital radios provide a relatively noise-free received demodulated baseband signal under typical operating conditions. Digital radios improve the received signal quality delivered to a radio operator over a wide range of received signal conditions by using error detection and correction techniques. Digital radios also provide other benefits compared to analog radios, e.g., more efficient spectral usage. The usable error detection and correction techniques may vary depending upon the type of communication and the latency, and may be implemented at different levels of a protocol stack.

At a link layer, error detection and correction techniques may include an error-correcting code (ECC). An example of an ECC is a forward error correction (FEC) code. The transmitter encodes the data with an error-correcting code (ECC) and sends the coded message. The receiver receives a noise-corrupted signal, and makes a maximum-likelihood estimation of the original transmitted message. ECC decoders are often located close to the front end of the digital radio receiver, e.g., in the first stage of digital processing after a signal has been received. ECC coders may also generate a bit-error rate (BER) signal or error count signal, which can be used as a feedback to gauge the quality of the received signal.

The BER may be an uncoded BER, which is the bit error rate prior to ECC correction, or a coded BER which is the BER after ECC decoding and which is what is delivered to the listener. The uncoded BER is more useful than a coded BER for the purpose of monitoring RF link degradations, because the uncoded BER is more sensitive to such degradations.

An example of a digital radio is the Harris' OpenSky® family of products, which offers digital audio and packet data communications using a high performance IP backbone network. OpenSky uses a continuously transmitting base station with separate error correction schemes for control channel and data. Continuous monitoring of base station traffic can provide a received signal strength indicator ("RSSI") and error numbers provided by an ECC decoder.

The error detection and correction capabilities of digital radio provide high-quality baseband analog audio transmission capability, as long as the digital radio is operating within the error detection and correction limits of the decoder. This is generally seen as an advantage because it increases the useful range within which digital radios can operate compared to analog radios.

However, beyond the error correction capabilities of the error detection and correction code, performance rapidly degrades. This presents a human-factors problem for operators of digital radio because the communication link appears to fail unexpectedly, without adequate warning to a radio operator. Furthermore, digital radios are frequently trunked—i.e., operated by packet transmission in order to deliver a communication only to an intended recipient—so that the radio operator is not able to receive an aural cue of transmission link quality by listening to other radio operators' communications.

Some radio operators (e.g., firefighters) object to the absence of an intuitive awareness that the signal is degrading and that interruption of communications is imminent. Some radio operators find this shortcoming objectionable enough to decide to revert to their familiar analog systems.

SUMMARY OF THE INVENTION

Embodiments of the present invention add a controlled amount of noise back into the error corrected audio output of a digital radio, in order to produce a composite audio output that simulates the operation of analog radios. The amount of noise is controlled by the detected quality of the signal received by the digital radio. The radio operator can interpret the noise as a warning that his communication is in danger of failing, and as an aural guide in finding a better area of coverage.

One or more embodiments of the invention may provide method or apparatus to provide an audible indicator of a quality of a received digital radio transmission, including receiving a digital radio transmission in a digital radio receiver, detecting the quality of the received digital radio transmission, decoding an audible communication from the received digital radio transmission, superimposing an audible indicator onto the audible communication, to form a composite audible signal, and dynamically adjusting an amplitude of the audible indicator relative to an amplitude of the audible communication responsive to a quality of the received digital audio transmission.

One or more embodiments of the invention may provide software stored in a memory that is coupled to a microprocessor, wherein, after reception of a digital radio transmission in a digital radio receiver, the microprocessor is programmed by the software to provide an audible indicator of a quality of the received digital radio transmission by detecting the quality of the received digital radio transmission, decoding an audible communication from the received digital radio transmission, superimposing an audible indicator onto the audible communication, to form a composite audible signal, and dynamically adjusting an amplitude of the audible indicator relative to an amplitude of the audible communication responsive to a quality of the received digital audio transmission. The microprocessor may be in the form of a digital signal processor.

Optional variations of the foregoing embodiments may include: detecting the quality of the received digital radio transmission by detecting a received signal strength indicator of the received digital radio transmission; detecting the quality of the received digital radio transmission by detecting a coded bit error rate of the received digital radio transmission; and detecting the quality of the received digital radio transmission comprises detecting a signal to noise ratio of the received digital radio transmission.

Optional variations of the foregoing embodiments may further include: comparing the quality of the received digital radio transmission to a first predetermined threshold, wherein the audible indicator is superimposed onto the audible communication only if the quality of the received digital radio transmission is below the first predetermined threshold; comparing the quality of the received digital radio transmission to a second predetermined threshold, wherein the audible indicator is superimposed onto the audible communication only if the quality of the received digital radio transmission is above the second predetermined threshold; and detecting whether the received digital radio transmission includes a communication from a remote radio operator, wherein the audible indicator is suppressed if a communication from the remote radio operator is detected.

Optional variations of the foregoing embodiments may further include selectively disabling the audible indicator responsive to a radio operator input to the digital radio receiver.

Optional variations of the foregoing embodiments may further include the audible indicator being one or more of a broadband noise signal, a simple tone, a complex tone, and a buzz.

BRIEF DESCRIPTION OF THE DRAWINGS

Embodiments will be described with reference to the following drawings figures, in which like numerals represent like items throughout the figures, and in which.

DETAILED DESCRIPTION OF THE INVENTION

Figure 1:
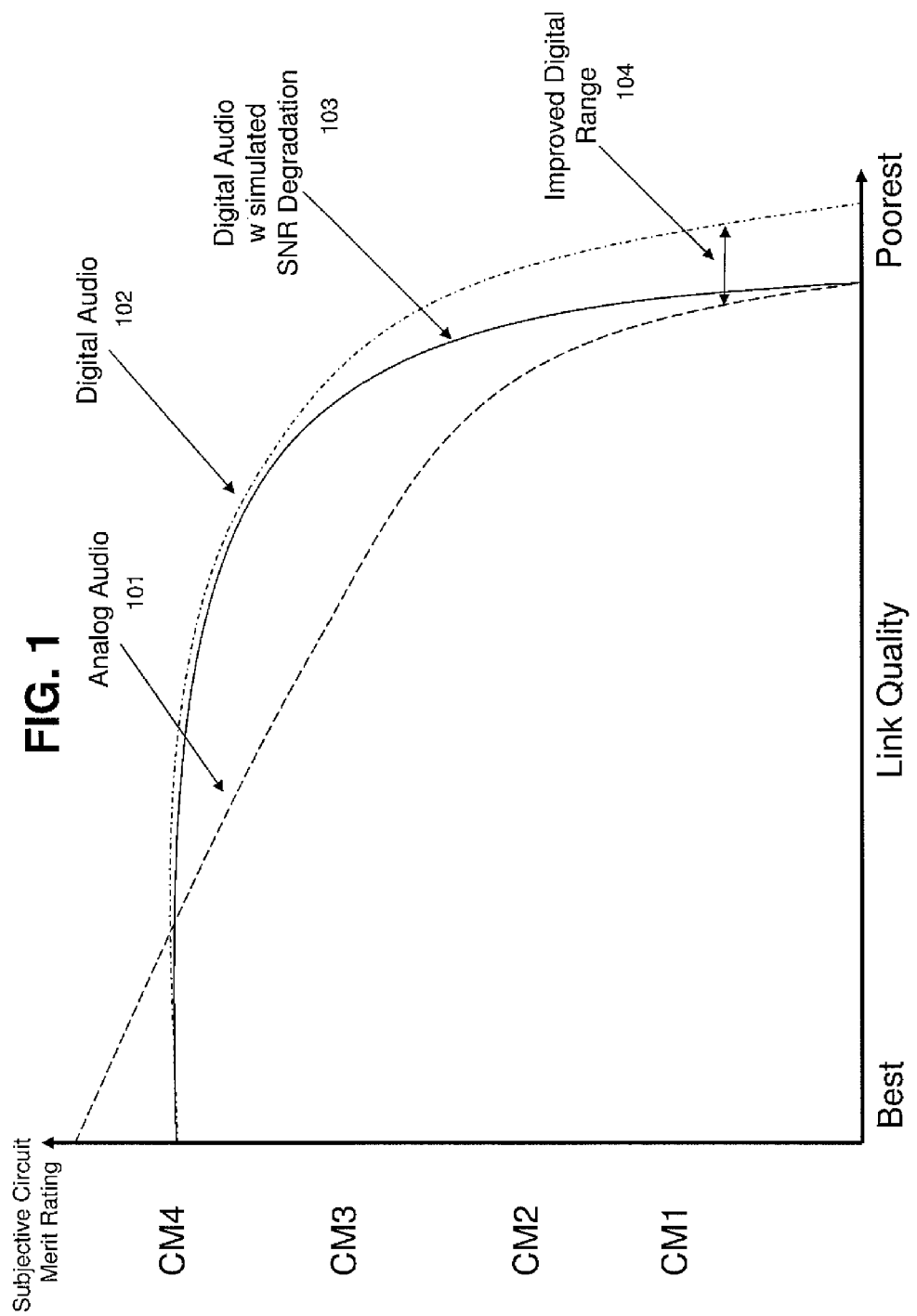
FIG. 1 is a comparison of audio intelligibility versus link quality for analog radio, digital radio without embodiments of the invention, and digital radio incorporating embodiments of the invention.

Analog radios receive an RF signal modulated by analog methods, and provide a demodulated baseband signal. The demodulated baseband signal includes noise that increases under increasingly degraded RF link conditions. Although generally the noise is unwanted, it beneficially provides an audible cue to degraded RF link conditions and an early warning to the possibility of loss of the communications link.

Digital radios use digital modulation techniques to provide, via a data channel, a demodulated baseband signal that is less susceptible to degraded RF link conditions. Digital radios may provide a control channel in addition to the data channel. The control channel can be routed to the same recipients as the data channel, and/or can be routed to other recipients such as a base station controller. The control channel can provide a way to control settings within the digital radio, or to report back the status of the digital radio, or to provide information about connectivity and/or link quality between various digital radios that are grouped to form a network. The control channel can also be used to set up and control trunking (i.e., connectivity) between digital radios.

An exemplary network may include a base station and one or more subscribers. The subscribers typically are mobile and are more likely to experience degraded RF link conditions. The base station typically is less mobile and may be in a fixed location, and therefore is less likely to experience degraded RF link conditions. The base station may be in charge of the network. Optionally, a dispatcher may be used to help control the network and assign network resources.

The demodulated baseband data channel signal may include digitized audio (e.g., voice) and/or non-audio packet data. The non-audio packet data may include, for instance, web pages, file transmissions, datalinks, etc., that may be intended for visual display on a screen or terminal. As long as the received signal is of sufficient quality to reliably demodulate the received signal, the digital radio should be able to determine whether an individual packet of data contains audio data or non-audio data, for instance by monitoring the contents of the packet itself (e.g., a header portion), or by information obtained via the control channel.

The demodulated baseband audio signal includes little or no perceptible noise for RF link conditions within design limits, but provides little warning to the radio operator if RF link conditions degrade toward exceeding design limits. Embodiments of the present invention selectively add a controlled amount of noise back into the error corrected audio output of the demodulated baseband data channel of a digital radio, in order to produce a composite audio output which simulates degraded RE link conditions.

For a non-audio packet data component of the demodulated baseband data channel, the packet data will not be audibly monitored by a human user. Adding noise to the data channel when it is carrying non-audio data would be ineffective to warn a user of degraded link conditions, and would further degrade the non-audio packet data. Therefore, embodiments of the present invention can inhibit the addition of a controlled amount of noise back into the error corrected output of the demodulated baseband data channel of a digital radio, on a packet-by-packet basis, if it is determined that a particular packet contains non-audio data.

Optionally, for non-audio packet data, it may be desirable to provide to a non-audio packet data subscriber and/or base station an alternate indication (e.g., an annunciator) of degraded link conditions, rather than adding the controlled amount of noise as is used for audio data. The annunciator can take one or more forms such as a pop-up window on a terminal in order to alert a user of degraded link conditions, or a chart/bars/bar-graph of RF link quality, or some change in attribute of at least a portion of a terminal display (e.g., changing text or screen color, or making text be bolder, bigger, blinking, displaying a status bar, etc.), or an audio indication that is separate from and not added to the received non-audio packet data (e.g., a chirp, alarm sound, recorded voice alert, tone, buzz, etc.).

There may be additional circumstances in which it may be desirable to selectively inhibit the controlled amount of noise. For instance, noise may be inhibited if a digital radio is monitoring the control channel at a base station without receiving the data channel. On the other hand, if an audio communication is trunked to more than one recipient, it may be desirable allow (i.e., not inhibit) the controlled amount of noise at a first digital radio (e.g., the base station) based on the transmission link quality at a second digital radio (e.g., a subscriber unit). This would inform the base station user of the poor transmission link quality to the subscriber unit.

There are at least two measurement metrics that can be used as an indication of degraded communications for use in controlling the amount of noise to add to demodulated baseband audio signals: First, the RSSI value can be used as a control to inject a specified level of noise into the audio output of the radio. The noise level can be made inversely proportional to the signal strength so that as the signal strength decreases, noise increases. The radio operator can then move to a position of better signal strength without needing to look at his radio.

Second, the error correction algorithm implemented in the receiver can report how many errors the algorithm found, and how many errors the algorithm corrected. As performance degrades, the number of both kinds of errors will rise. The number of errors of either kind, or both together, can therefore be used to control the amplitude of added noise to the composite audio output. This measurement metric is suitable for both low signal powers, and for conditions that cause errors without necessarily causing a loss of signal power. An example of the latter is errors that may be induced by the presence of strong adjacent channel interference.

A combined approach can also be used, in which both the RSSI and the count of detected and/or corrected errors can be used to determine the amount of injected noise. This approach has the advantage of indicating failing communications both in the presence of strong interference, as well as in weak RF signal strength regions. If desired, a separate indicator such as a simple tone, complex tone, buzz or the like could also be used to indicate interference, wherein the volume of the separate indicator depends upon the error count or BER. A tone, buzz, or the like has the advantage in that such an audio indicator may be familiar to operators of legacy analog radios as indicating the presence of an adjacent channel interference.

FIG. 1 is a qualitative comparison of analog radio performance to digital radio, with and without additive noise, as the link quality is varied. The abscissa is link quality, and the ordinate is a subjective intelligibility perception rating (i.e., received signal merit). Curve 101 represents performance of analog radio. At very good link qualities, analog radio does not have certain degradations such as quantization noise which are inherent to digital modulation. As link quality degrades, the perception rating gradually degrades. Curve 102 represents performance of digital radios. The curve 102 perception rating is maintained at a high level for a large range of link quality, but rapidly degrades beyond a threshold of link quality. Difference 104 between curves 101 and 102 represents the improvement afforded by use of digital radio. Curve 103 represents performance of digital radios with additive noise according to one or more embodiments of the invention. The curve 103 perception rating is maintained at a level similar to the curve 102 perception rating for the better link qualities. As more noise is added for poorer link qualities, the curve 103 perception rating approaches that of curve 101 for analog radio.

Figure 2:
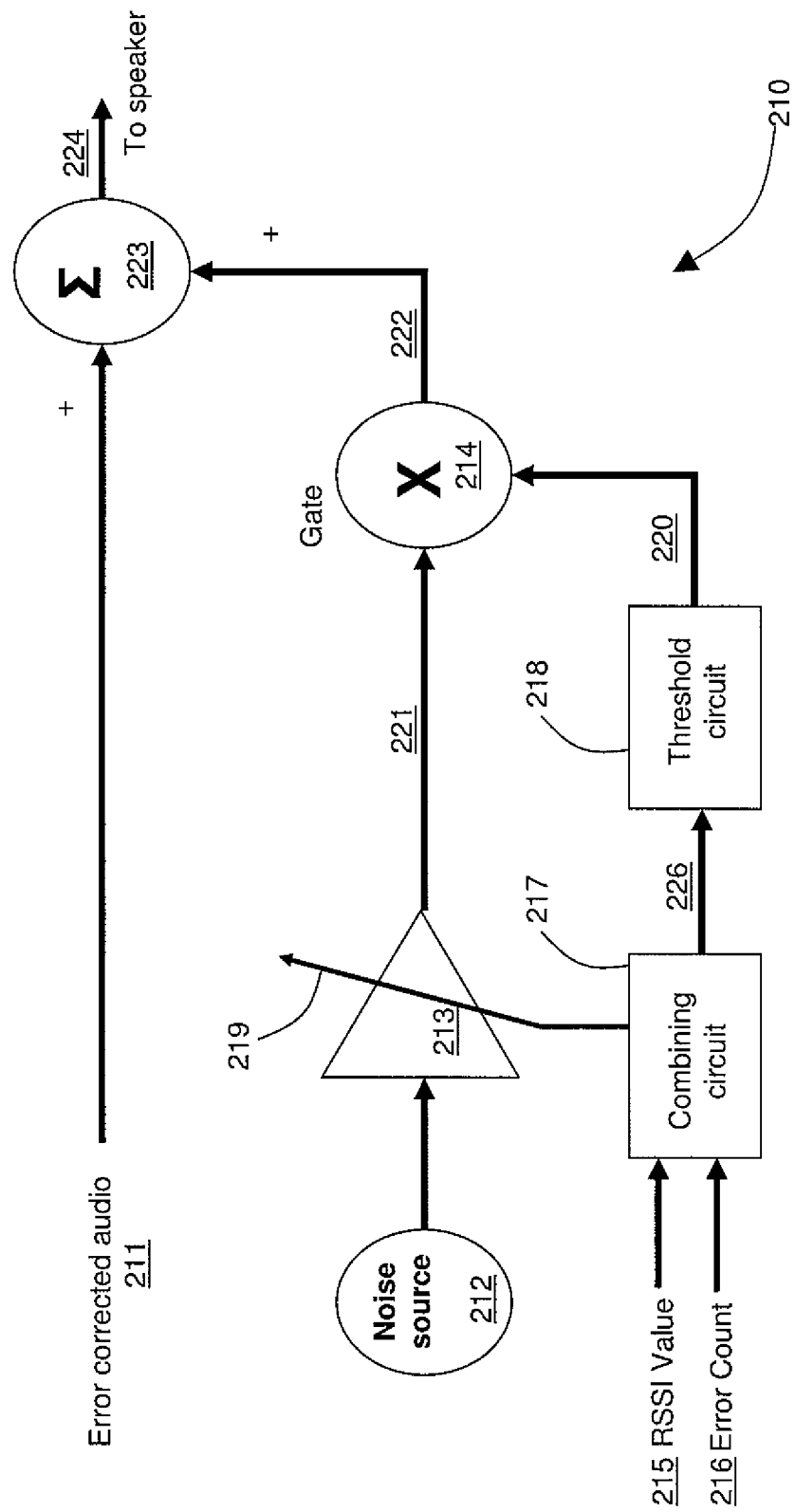
FIG. 2 is a simplified block diagram of a first embodiment of a portion of a digital receiver that is useful for understanding the present invention.

Referring now to FIG. 2, there is provided a simplified functional block diagram of an output section 210 of a digital receiver that is useful for understanding the present invention. For simplicity, output section 210 of a digital receiver may be referred herein simply as the output section 210 when the surrounding context is clear that the reference is to the output section 210 of the digital receiver. Not shown is the input section of the digital receiver, including amplifiers, filters, and other components known in the art to digital radio designers. As shown in FIG. 2, the output section 210 is configured to accept an error-corrected, demodulated and downconverted baseband signal 211, generated by a front end (not shown) of the digital receiver.

Output section 210 is further configured to accept an RSSI value 215. RSSI value 215 is generated in a front end (not shown) of the digital receiver, by circuits and methods known to persons skilled in the art of RF radio receiver design. RSSI value 215 is an indicator of the power of the RF energy received by the digital receiver. Higher RSSI value 215 corresponds to higher received RF power. The RF energy includes both a desired digital radio signal, and noise energy within a predetermined bandwidth, the noise energy corrupting the desired digital radio signal. The noise energy may include a broadband noise arising from, e.g., the noise floor of the receiver. The noise energy may further include energy from one or more non-broadband noise sources, such as an unwanted interfering signal (e.g., an adjacent channel transmission) received by the digital receiver. The predetermined bandwidth for detecting RSSI may be determined by, e.g., a channel bandwidth of the receiver, or a detection bandwidth of the demodulator circuit.

Output section 210 is further configured to accept an error count 216 of the number of errors. Error count 216 is generated in a front end (not shown) of the digital receiver, by the error detection and correction circuit (e.g., the ECC decoder). The error count 216 may indicate the number of digital errors from the input RF digital radio signal that were detected and/or corrected by the error detection and correction circuit. Alternatively, error count 216 may indicate a bit error rate, rather than a count of errors, so that the method is adaptable to different data rates of the RF digital radio signal, or to changes in the data rate.

The error count 216 may also represent an error count based upon a portion of the input RF digital radio signal, rather than upon the entirety of the input RF digital radio signal. For instance, when a control channel and a data channel are transmitted together but have separate ECC schemes, then separate error counts may be available for each portion of the input RF digital radio signal. In this situation, because the data channel is processed to form the demodulated baseband signal presented to the radio operator, then if error counts are being used to control the additive noise, it would be preferable to control the additive noise based upon an error count of the data channel. However, an error count of the control channel could also be used as long as the control channel error count is correlated with the data channel error count.

Output section 210 includes a noise source 212 which may be a broadband noise source such as a white noise source; or other kind of noise such as a simple tone, a complex (i.e., multispectral) tone, a buzzing noise, or similar. The output of noise source 212 is provided to a variable gain amplifier 213, which produces an amplified noise. The gain of variable gain amplifier 213 is controlled by a control signal 219 produced by combining circuit 217.

Combining circuit 217, included in output section 210, is configured to accept the RSSI value 215 and the error count 216 as inputs, and is configured to produce the control signal 219 that is used to control the gain of variable gain amplifier 213.

In one embodiment, combining circuit 217 is configured to control noise source 212 such that the noise level is inversely proportional to the RSSI value 215 within at least a predetermined range of RSSI values.

In another embodiment, combining circuit 217 is configured to control noise source 212 such that the noise level is dependent on the error count 216, such that a larger error count 216 produces a larger gain in variable gain amplifier 213 within at least a predetermined range of error count values.

In another embodiment, combining circuit 217 is configured such that both the RSSI value 215 and error count 216 are used in order to control the noise level according to the noise levels indicated by a combination of RSSI value 215 and error count 216. Further more, the type of noise may be controlled by the relative sizes of the RSSI value 215 and error count 216. For instance, if RSSI value 215 is relatively high, then noise source 212 produces a broadband noise, regardless of the size of error count 216. However, if RSSI value 215 is relatively high, but error count 216 is also relatively high, then noise source 212 may produce another kind of noise such as a simple tone, a complex (i.e., multispectral) tone, a buzzing noise, or similar.

In another embodiment, the gain of variable gain amplifier 213 may be controlled such that a duty cycle is imparted upon the noise signal to form bursts of noise, and the duty cycle and/or repetition rate of the bursts is controlled by the quality of the received radio transmission.

It is not desirable to have the digital radio outputting noise continuously, from both battery life and radio operator fatigue considerations. Therefore, embodiments of the present invention can gate (i.e., enable or disable) the audio noise output upon: detection of incoming transmission (e.g., another radio operator's communication) from a transmitting digital radio in communication with the digital radio receiver and/or operation at an RSSI and/or error rate curve beyond one or more thresholds. For example, no noise need be output when the radio is in a strong signal strength area with low error correction rate, because there is unlikely to be imminent link loss. Noise might be occasionally output in an increasingly marginal coverage area, with more frequent or larger amplitude noise presented to a radio operator when the digital radio communication is close to failing.

To this end, output section 210 further includes a thresholding circuit 218 in communication with the combining circuit 217 via interface 226. Thresholding circuit 218 is configured to enable or disable addition of noise based on the RSSI value 215 and error count 216. If RSSI value 215 is relatively high and error count 216 is relatively low, then a very good received RF signal is indicated, and addition of noise to the error corrected audio 211 is suppressed. Noise suppression, when determined to be appropriate by thresholding circuit 218, is by use of gate 214. Gate 214 produces gated noise, which is provided on interface 222. Addition of noise is suppressed in this situation because there is little risk of imminent communication loss, and therefore little need to inform the radio operator of the link condition. Suppressing noise in this situation may conserve power usage by the radio, and will improve intelligibility of the communication because of the elimination of unnecessary noise, if the noise has not already been suppressed on account of the detection of a radio operator's communication.

Conversely, if the RSSI value 215 is relatively low, then a very poor link condition is indicated. If the RSSI value is beyond the ability of the ECC to correct, then a signal may already be lost on the error corrected audio 211 input line, and there would be no need to add noise in order to warn the radio operator of impending signal loss. Suppressing noise in this situation may conserve power usage by the radio.

The noise may be further gated by radio operator control, e.g., a squelch button, such that the radio operator can selectively disable or enable the addition of noise.

Figure 3:
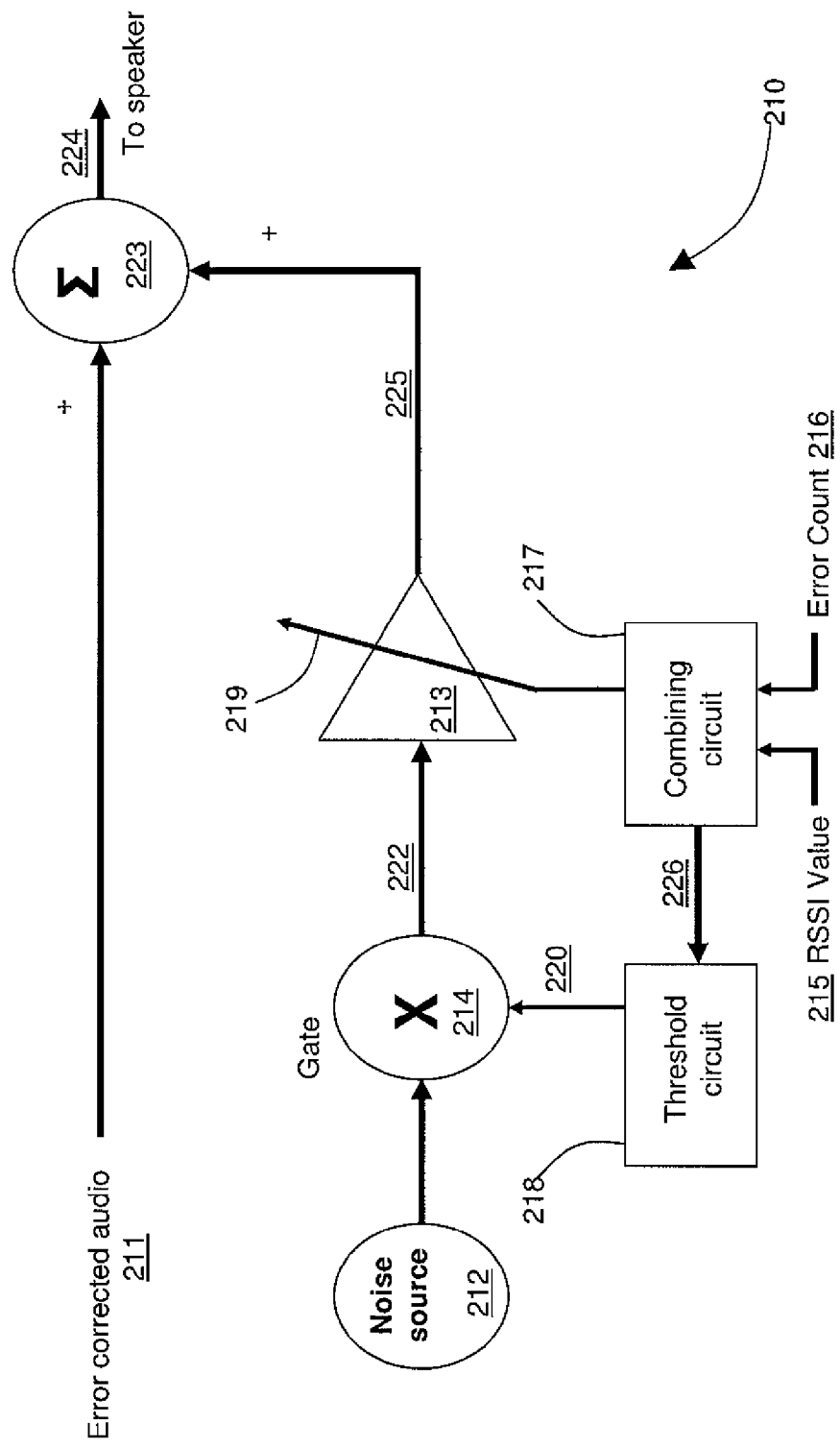
FIG. 3 is a simplified block diagram of a second embodiment of a portion of a digital receiver that is useful for understanding the present invention.

FIG. 3 presents an alternative embodiment, in which gate 214 gates the noise source 212 before the noise is applied to variable gain amplifier 213. A disadvantage of this configuration is that noise generated within variable gain amplifier 213, as quantified by the noise figure of variable gain amplifier 213, is not suppressed before being added to the audio stream sent to the speaker.

Figure 4:
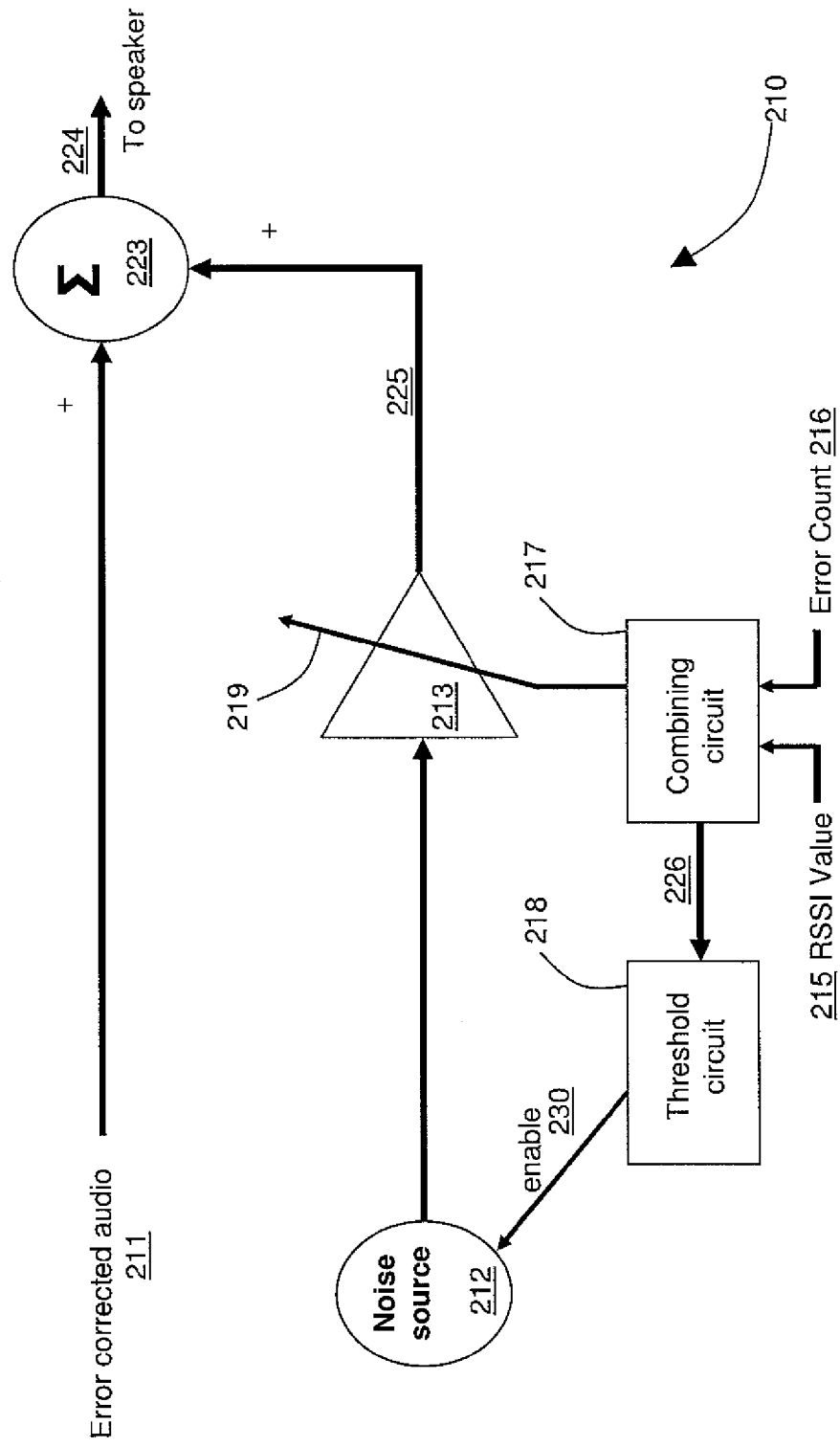
FIG. 4 is a simplified block diagram of a third embodiment of a portion of a digital receiver that is useful for understanding the present invention.

FIG. 4 presents an alternative embodiment, in which noise source 212 is configured to accept an enable signal 30 from threshold circuit 218. An advantage of this configuration is that the on/off status of noise source 212 can be positively controlled, thereby allowing for reduced power consumption by output section 210 if the noise source 212 is turned off when not needed.

Returning again to FIG. 2, a combiner 223 is configured to accept the error-corrected, demodulated and downconverted baseband signal 211 and the gated noise from gate 214 via interface 222, in order to produce a composite audible signal that is presented to a speaker (not shown) via interface 224. Similarly, referring to FIGS. 3-4, the combiner 223 is configured to accept the amplified noise signal from variable gain amplifier 213, via interface 225, in order to produce a composite audible signal that is presented to a speaker (not shown) via interface 224.

Figure 5:
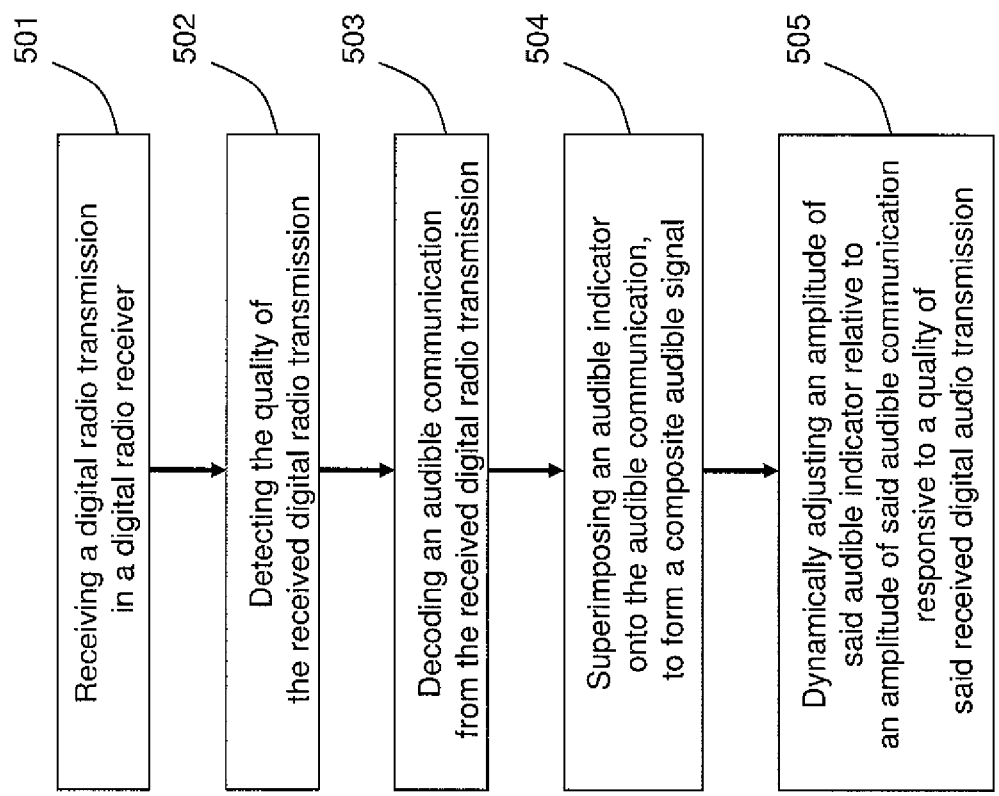
FIG. 5 is a flow chart of a method for simulating the degradation of SNR in decoded digital audio, correlated to wireless link BER, according to an embodiment of the invention.

Referring now to FIG. 5, there is provided a flow chart of a method according to an embodiment of the invention. The method begins with step 501, the step of receiving a digital radio transmission in a digital radio receiver. This step includes steps known to those skilled in the art of radio design.

The method continues with step 502, the step of detecting the quality of the received digital radio transmission. The step of detecting the quality may be accomplished by way of detecting the RSSI, and/or by detecting one or more error counts provided by an ECC circuit. In one or more embodiments, step 502 may be interchanged with step 503 described below.

The method continues with step 503, the step of decoding an audible communication from the received digital radio transmission. This step involves producing an audible baseband signal from the received digital RF signal. In one or more embodiments, step 503 may be interchanged with step 502 described above.

The method continues with step 504, the step of superimposing an audible indicator onto the audible communication, to form a composite audible signal. The type of audible indicator may include broadband noise, a single tone, a complex tone, and/or a buzz or the like.

The method continues with step 505, the step of dynamically adjusting an amplitude of the audible indicator relative to an amplitude of the audible communication responsive to a quality of the received digital audio transmission. In one or more embodiments of the invention, the amplitude of the audible indicator may be adjusted inversely proportionally to the quality of the received digital audio transmission within at least a portion of the range in variation of quality—i.e., as the quality increases, the amplitude of the audible indicator decreases relative to the amplitude of the audible communication. In one or more embodiments, the audible indicator may be turned off or adjusted to a substantially inaudible level if the quality of the received digital audio transmission exceeds a first predetermined level. In this situation, the quality of the received digital audio transmission is such that there is little risk of imminent link loss, and therefore little need to inform the radio operator of the link quality. In another embodiment, the audible indicator may be turned off or adjusted to a substantially inaudible level if the quality of the received digital audio transmission does not exceed a second predetermined level. In this situation, the quality of the received digital audio transmission is so poor that the audible baseband signal of step 503 cannot be produced (i.e., the signal is lost) or is already corrupted or distorted because the capability of the ECC code has been exceeded. In another embodiment, the audible indicator may be turned off or adjusted to a substantially inaudible level if it is detected that the transmitting digital radio is actively transmitting a radio operator's conversation.

A person skilled in the art will appreciate that the methods presented herein are selected embodiments of a method to degrade SNR in decoded digital audio, the degradation being correlated to a wireless link quality. However, the invention is not limited in this regard and any other method, system or apparatus can be used without limitation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method to provide an audible indicator of a quality of a received digital radio transmission, comprising the steps of:
    receiving a digital radio transmission in a digital radio receiver;
    determining a plurality of measurement metrics indicating the quality of the received digital radio transmission;
    decoding an audible communication from the received digital radio transmission;
    dynamically selecting a type of audible indicator based on results of a comparison of values determined for the plurality of measurement metrics;
    superimposing an audible indicator onto the audible communication to form a composite audible signal, where the audible indicator is of the type of audible indicator previously dynamically selected; and
    dynamically adjusting an amplitude of said audible indicator relative to an amplitude of said audible communication responsive to a quality of said received digital radio transmission.

2. The method of claim 1, wherein the plurality of measurement metrics comprises a received signal strength indicator of the received digital radio transmission.

3. The method of claim 1, wherein the plurality of measurement metrics comprises a coded bit error rate of the received digital radio transmission.

4. The method of claim 1, wherein the plurality of measurement metrics comprises a signal to noise ratio of the received digital radio transmission.

5. The method of claim 1, further comprising the step of comparing the quality of the received digital radio transmission to a first predetermined threshold, wherein the audible indicator is superimposed onto the audible communication only if the quality of the received digital radio transmission is below the first predetermined threshold.

6. The method of claim 1, further comprising the step of comparing the quality of the received digital radio transmission to a second predetermined threshold, wherein the audible indicator is superimposed onto the audible communication only if the quality of the received digital radio transmission is above the second predetermined threshold.

7. The method of claim 1, further comprising the step of detecting whether the received digital radio transmission includes a communication from a remote operator, wherein the audible indicator is suppressed if a communication from the remote operator is detected.

8. The method of claim 1, further comprising selectively disabling the audible indicator responsive to a user input to said digital radio receiver.

9. The method of claim 1, wherein the audible indicator comprises a broadband noise signal.

10. The method of claim 1, wherein the audible indicator comprises a noise signal selected from the group consisting of a simple tone, a complex tone, and a buzz.

11. The method of claim 1, further comprising the step of:
    presenting an alert signal to a user of the digital radio receiver, wherein the alert signal is separate from the audible communication.

12. An apparatus to provide an audible indicator of a quality of a received digital radio transmission, comprising:
    a detector configured to determine a plurality of measurement metrics indicating the quality of the received digital radio transmission;
    a decoder configured to decode an audible communication from the received digital radio transmission;
    a signal source configured to dynamically select a type of audible indictor based on results of a comparison of values determined for the plurality of measurement metrics, and to form an audible indicator signal of the type of audible indictor previously dynamically selected that is to be used for indicating said received digital radio transmission has a predetermined signal quality; and
    a combiner configured to superimpose the audible indicator onto the audible communication, in order to form a composite audible signal.

13. The apparatus of claim 12, wherein the plurality of measurement metrics comprises a received signal strength of the received digital radio transmission.

14. The apparatus of claim 12, wherein the plurality of measurement metrics comprises a coded bit error rate of the received digital radio transmission.

15. The apparatus of claim 12, wherein the plurality of measurement metrics comprises a signal to noise ratio detector of the received digital radio transmission.

16. The apparatus of claim 12, further comprising a first comparator to compare the quality of the received digital radio transmission to a first predetermined threshold, wherein the audible indicator is superimposed onto the audible communication only if the quality of the received digital radio transmission is below the first predetermined threshold.

17. The apparatus of claim 12, further comprising a second comparator to compare the quality of the received digital radio transmission to a second predetermined threshold, wherein the audible indicator is superimposed onto the audible communication only if the quality of the received digital radio transmission is above the second predetermined threshold.

18. The apparatus of claim 12, further comprising another detector to detect whether the received digital radio transmission includes a communication from a remote operator, wherein the audible indicator is suppressed if a communication from the remote operator is detected.

19. The apparatus of claim 12, further comprising a user-controllable circuit to disable superimposing the audible indicator onto the audible communication.

20. The apparatus of claim 12, wherein the audible indicator comprises a broadband noise signal.

21. The apparatus of claim 12, wherein the audible indicator comprises a noise signal selected from the group consisting of a simple tone, a complex tone, and a buzz.

22. An apparatus to provide an audible indicator of a quality of a received digital radio transmission, comprising:
  a digital radio receiver configured to receive a digital radio transmission; and
  a microprocessor coupled to a memory,
  wherein the microprocessor is programmed to provide an audible indicator of a quality of a received digital radio transmission by:
    determining a plurality of measurement metrics indicating the quality of the received digital radio transmission;
    dynamically selecting a type of audible indicator based on results of a comparison of values determined for the plurality of measurement metrics;
    superimposing an audible indicator onto a decoded audible communication obtained from the received digital radio transmission, to form a composite audible signal, where the audible indicator is of the type of audible indicator previously dynamically selected; and
    dynamically adjusting an amplitude of said audible indicator relative to an amplitude of said audible communication responsive to a quality of said received digital radio transmission.

23. The apparatus of claim 22, wherein the microprocessor is further programmed to provide an audible indicator of a quality of a received digital radio transmission by comparing the quality of the received digital radio transmission to a first predetermined threshold, wherein the audible indicator is superimposed onto the audible communication only if the quality of the received digital radio transmission is below the first predetermined threshold.

24. The apparatus of claim 22, wherein the microprocessor is further programmed to provide an audible indicator of a quality of a received digital radio transmission by comparing the quality of the received digital radio transmission to a second predetermined threshold, wherein the audible indicator is superimposed onto the audible communication only if the quality of the received digital radio transmission is above the second predetermined threshold.

25. The apparatus of claim 22, wherein the microprocessor is further programmed to detect whether the received digital radio transmission includes a communication from a remote operator, wherein the audible indicator is suppressed if a communication from the remote operator is detected.

26. A method to provide an audible indicator of a quality of a received digital radio transmission, comprising:
  receiving a digital radio transmission in a digital radio receiver;
  detecting a received signal strength indicator of the received digital radio transmission;
  detecting a coded bit error rate of the received digital radio transmission; and
  dynamically selecting a type of audible indicator of a plurality of types of audible indicators based on results of a comparison of values detected for the received signal strength indicator and the coded bit error rate.

\* \* \* \* \*